United States Patent
Shimizu et al.

(10) Patent No.: US 8,667,537 B2
(45) Date of Patent: Mar. 4, 2014

(54) DIGITAL BROADCAST RECEIVER AND DIGITAL BROADCAST RECEPTION METHOD

(75) Inventors: Toshinori Shimizu, Osaka (JP); Ryuhsuke Watanabe, Osaka (JP); Hajime Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 13/122,688

(22) PCT Filed: Oct. 5, 2009

(86) PCT No.: PCT/JP2009/067346
§ 371 (c)(1),
(2), (4) Date: Apr. 5, 2011

(87) PCT Pub. No.: WO2010/041627
PCT Pub. Date: Apr. 15, 2010

(65) Prior Publication Data
US 2011/0197244 A1 Aug. 11, 2011

(30) Foreign Application Priority Data
Oct. 6, 2008 (JP) .................................. 2008-260098

(51) Int. Cl.
*H04N 5/445* (2011.01)
*H04N 7/173* (2011.01)

(52) U.S. Cl.
USPC .............................. 725/50; 725/110; 725/132

(58) Field of Classification Search
USPC ............................... 725/50, 54, 105, 110, 132
See application file for complete search history.

(56) References Cited

U.S. PATENT DOCUMENTS 8,112,775 B2 * 2/2012 Lee et al. .......................... 725/50
8,234,673 B2 * 7/2012 Kinoshita et al. ............... 725/51
(Continued)

FOREIGN PATENT DOCUMENTS

JP 2002-64769 A 2/2002
JP 2004-112621 A 4/2004
(Continued)

OTHER PUBLICATIONS

Mexican Office Action issued Feb. 20, 2012.
(Continued)

*Primary Examiner* — James R Sheleheda
(74) *Attorney, Agent, or Firm* — Birch, Stewart, Kolasch & Birch, LLP

(57) ABSTRACT

Upon start of processing, a digital broadcast receiver can acquire a CDN configuration information file (XML) after newly connected to a CDN by a user's operation. Next, the digital broadcast receiver acquires a PF configuration information file written in the CDN configuration information. The digital broadcast receiver judges whether there is an IP broadcast or not. If there is an IP broadcast, the digital broadcast receiver connects to a multicast address described in the PF configuration information file (XML), and acquires information on all channels in the PF from a SI dedicated stream (all station SI including no video or audio) (channel scan). The URL of a SNTP is described in the CDN configuration information file. Time information is acquired through the SNTP at the same time as (or at a timing near the timing of, such as immediately before or immediately after) the channel scan. The above processing enables easy time acquisition which is a problem peculiar to an IPTV with which viewing of an IP broadcast is possible.

5 Claims, 4 Drawing Sheets

(56) References Cited

U.S. PATENT DOCUMENTS

| | | |
|---|---|---|
| 2004/0172326 A1* | 9/2004 | Yeo et al. ............... 705/14 |
| 2005/0195862 A1* | 9/2005 | Jones et al. ............. 370/503 |
| 2006/0072603 A1* | 4/2006 | Kamise ................... 370/432 |
| 2006/0233132 A1* | 10/2006 | Lee ........................ 370/328 |
| 2006/0259938 A1 | 11/2006 | Kinoshita et al. |
| 2007/0104181 A1* | 5/2007 | Lee et al. ................ 370/352 |
| 2008/0040744 A1* | 2/2008 | Sukuki .................... 725/39 |
| 2008/0083004 A1* | 4/2008 | Kim et al. ............... 725/114 |
| 2008/0092184 A1* | 4/2008 | Kim et al. ............... 725/110 |
| 2008/0092185 A1* | 4/2008 | Kim et al. ............... 725/110 |
| 2008/0127265 A1* | 5/2008 | Ward et al. .............. 725/42 |
| 2008/0168486 A1* | 7/2008 | Song et al. .............. 725/28 |
| 2008/0216110 A1* | 9/2008 | Song et al. .............. 725/25 |
| 2009/0100470 A1* | 4/2009 | Yai et al. ................. 725/46 |
| 2009/0144783 A1* | 6/2009 | Lee et al. ................ 725/93 |
| 2009/0144790 A1* | 6/2009 | Lee et al. ................ 725/110 |
| 2009/0150933 A1* | 6/2009 | Lee et al. ................ 725/40 |
| 2009/0158327 A1* | 6/2009 | Song et al. .............. 725/38 |
| 2009/0158330 A1* | 6/2009 | Song et al. .............. 725/39 |
| 2009/0158348 A1* | 6/2009 | Song et al. .............. 725/54 |
| 2009/0158349 A1* | 6/2009 | Song et al. .............. 725/54 |
| 2009/0165050 A1* | 6/2009 | Lee et al. ................ 725/39 |
| 2009/0183206 A1* | 7/2009 | Lee et al. ................ 725/56 |
| 2009/0187960 A1* | 7/2009 | Lee et al. ................ 725/131 |
| 2009/0193469 A1* | 7/2009 | Igarashi .................. 725/56 |
| 2009/0204986 A1* | 8/2009 | Lee et al. ................ 725/27 |
| 2010/0251315 A1* | 9/2010 | Ohmae .................... 725/110 |
| 2011/0197244 A1* | 8/2011 | Shimizu et al. .......... 725/110 |
| 2011/0202642 A1* | 8/2011 | Shimizu ................... 709/221 |

FOREIGN PATENT DOCUMENTS

| | | | |
|---|---|---|---|
| JP | 2005-167668 A | | 6/2005 |
| JP | 2005167668 A | * | 6/2005 |
| JP | 2007-329800 A | | 12/2007 |
| JP | 2008-124857 A | | 5/2008 |

OTHER PUBLICATIONS

"Digital Video Broadcasting (DVB); Transport of MPEG-2 Based DVB Services over IP Based Networks European Broadcasting Union Union Europeenne de Radio—Television EBUUER; ETSI TS 102 034" IEEE, LIS, Sophia Antipolis Cedex, France, vol. BC, No. V1.2.1, Sep. 1, 2006.

European Search Report dated Nov. 6, 2012.

Japanese Office Action issued Dec. 11, 2012.

Chinese Office Action issued Jun. 24, 2013 for corresponding Chinese Application No. 200980139852.6.

* cited by examiner

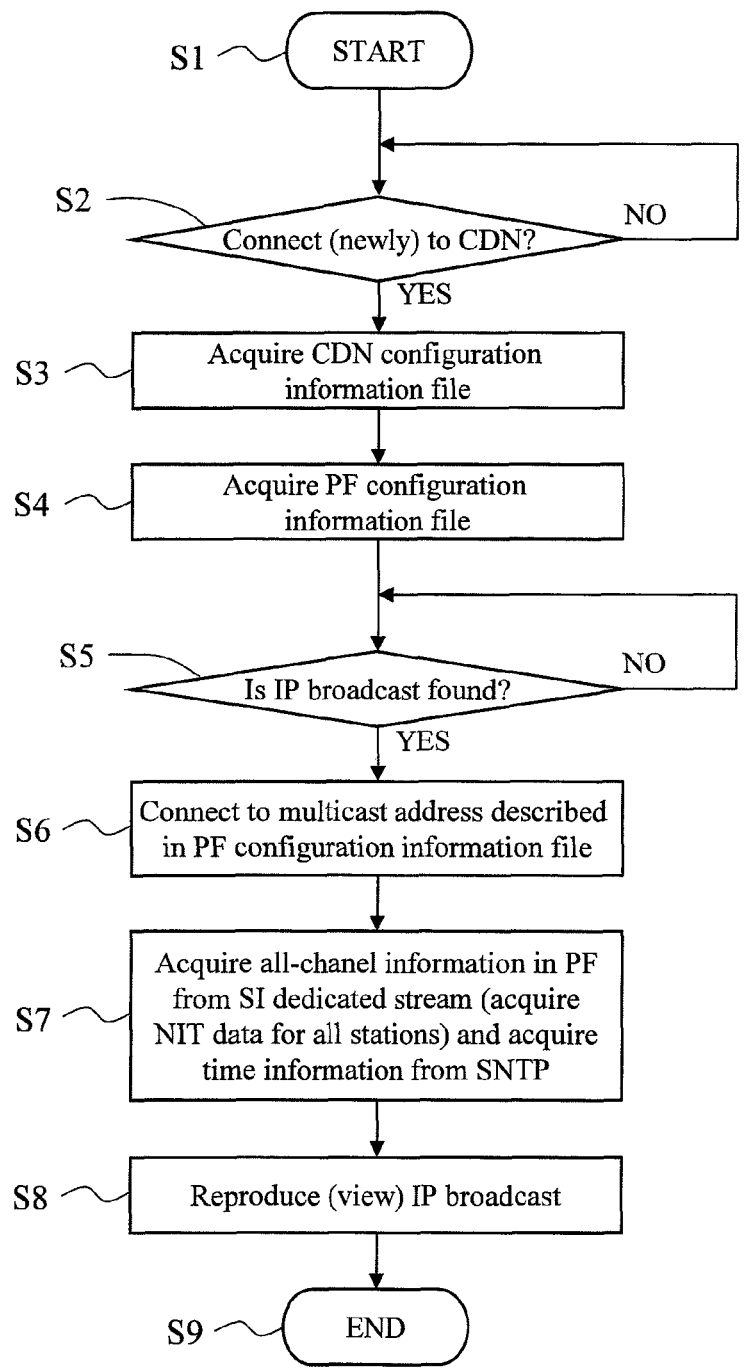

FIG. 3A

```
CDN configuration information file (XML)
 <cdn_main>
  <header>
   <cdn_serial>
     2008082600
   </cdn_serial>
  </header>
  <cdn_name>
    MttEastFlets
  </cdn_name>
  <sntp>
   <sntp_server>
     ntp.flets.net
   </sntp_server>
   <time_polarity>
     1
   </time_polarity>
   <time_delay>
     0900
   </time_delay>
  </sntp>
  <platform_list>
   <platform>
    <network_id>
      7780
    </network_id>
    <platform_name>
      KODAMA TV
    </platform_name>
    <pf_url>
      http://www.abc.iptvf.jp/fdn-e/pf.comp
    </pf_url>
    <pf_serial>
      2008082600
    </pf_serial>
   </platform>
  </platform_list>

</cdn_main>
```

⟵ SNTP information  31

FIG. 3B

```
Example of PF configuration information file (XML)
<platform_main>
 <header>
  <pf_serial>
    2008082600
  </pf_serial>
 </header>
 <platform_name>
   KODAMA TV
 </platform_name>
 <logo_url>
    http://tspstbvod1.abc.iptvf.jp/ipsp_stb/logo.new/logo2008040401.comp
 </logo_url>
 <drm_provider_id>
   0103
 </drm_provider_id>
 <ip_broadcast_service>
   <network_id>
     7780
   </network_id>
   <si_stream>
     <ip_protocol>
       1
     </ip_protocol>
     <channel_signaling>
       1
     </channel_signaling>
     <stream_port_number>
       30004
     </stream_port_number>
     <multicast_address>
       ff38::100
     </multicast_address>
     <source_address>
       2001:c90:6e00:ff2b::3:1
     </source_address>
   </si_stream>
 </ip_broadcast_service>
   .
   .
   .
</platform_main>
```

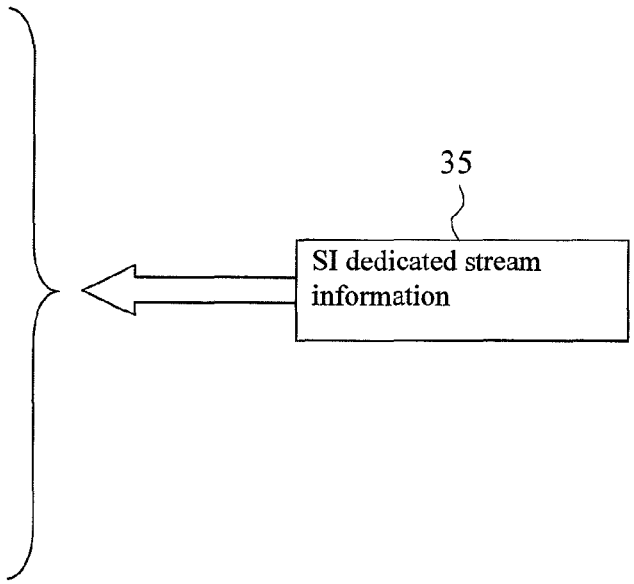

35

SI dedicated stream information

DIGITAL BROADCAST RECEIVER AND DIGITAL BROADCAST RECEPTION METHOD

TECHNICAL FIELD

The present invention relates to a digital broadcast reception technique, and particularly to a time setting technique in a digital broadcast receiver including an IPTV function.

BACKGROUND ART

In a digital broadcast receiver, timer viewing, timer recording and the like from an electronic program guide can be made accurately by setting the time of its timer. Generally, the time setting processing is performed at the time of initial setting of the digital broadcast receiver. In addition, a channel search is carried out at the time of the initial setting. A technique described in Patent Document 1 is to execute an efficient channel search and thus contributes to user convenience.
Patent Document 1: JP-A 2004-112621

DISCLOSURE OF THE INVENTION

Problems to be Solved by the Invention

In recent years, various contents other than digital broadcast programs have been received by using a digital broadcast receiver.

However, it is hard for a viewer using the receiver to be aware of the necessity to change its setting depending on the nature of receivable contents. Even if the user is aware of this, an operation for the setting change is still complicated and bothersome for the user. For this reason, there is a problem that the user cannot receive or no longer feels like receiving a service that the user can be originally granted.

For example, an IPTV (Internet Protocol Television), which is a service for delivering a digital television broadcast using an IP, is considered to be often used in the future. In this case, there is a problem that, without time setting, viewing of an electronic program guide (EPG) is not allowed even though viewing of IPTV programs is possible, for example. Such a problem never occurs when only a terrestrial broadcast is received. Patent Document 1 describes a technique related to a channel search, but does not describe any problem peculiar to an IPTV (time acquisition).

The present invention provides a technique for easily performing time acquisition which is a problem peculiar to an IPTV with which viewing of an IP broadcast is also possible.

Means for Solving the Problems

According to the present invention, the time of a receiver is set at the same time as a (initial) channel search of an IPTV.

An aspect of the present invention provides a digital broadcast receiver including a timer and being capable of receiving an IP broadcast, characterized by comprising a controller configured to perform initial channel search processing on the basis of SI dedicated stream information described in a PF configuration information file in a CDN configuration information file acquired after the digital broadcast receiver is newly connected to a CDN, at a time of processing of acquiring time information through a SNTP which is described in the CDN configuration information file. The initial channel search processing may be performed at a timing near the timing of the time information acquisition processing through the SNTP. The SI dedicated stream is received through the RTP (UDP) protocol which is a protocol different from the SNTP for the time information acquisition processing. By use of this, the stream information and time information can be acquired at the same time. Since the time is also set at the time of the initial channel search, even when the digital broadcast receiver receives an IP broadcast, a viewer can enjoy a service received by the receiver without any burden being imposed on the viewer.

It is preferable that the controller performs processing if an IP broadcast is found in processing to determine whether there is an IP broadcast or not. It is preferable that the controller reflects the time information to the timer, and performs processing of acquiring electronic program guide information acquirable from a digital broadcast wave, on the basis of the time information in the timer.

Another aspect of the present invention provides a reception method in a digital broadcast receiver including a timer and being capable of receiving an IP broadcast, the method characterized by comprising the step of performing initial channel search processing on the basis of SI dedicated stream information described in a PF configuration information file described in a CDN configuration information file acquired after the digital broadcast receiver is newly connected to a CDN, at a timing near a timing of processing of acquiring time information through a SNTP which is described in the CDN configuration information file.

The present invention may be a program causing a computer to execute the method described above. The present invention may also be a computer-readable recording medium on which the program is recorded. The program may also be one obtained through a transmission medium such as the Internet.

This specification includes the contents of the specification and/or drawings of Japanese Patent Application No. 2008-260098 which is the basis of priority of the subject application.

Effects of the Invention

According to the present invention, the time is also set at the time of the initial channel search, which enhances the function of the receiver itself. Thereby, even when the receiver is capable of receiving an IP broadcast, a viewer can enjoy a service received by the receiver without any burden being imposed on the viewer.

BRIEF DESCRIPTION OF THE DRAWINGS

FIG. 2 is a flowchart showing a flow of time information acquisition processing in the digital broadcast receiver according to this embodiment.

FIG. 3A is a view showing an example of a CDN configuration information file (XML).

FIG. 3B is a view showing an example of a PF configuration information file (XML).

EXPLANATION OF REFERENCE NUMERALS

Figure 1:
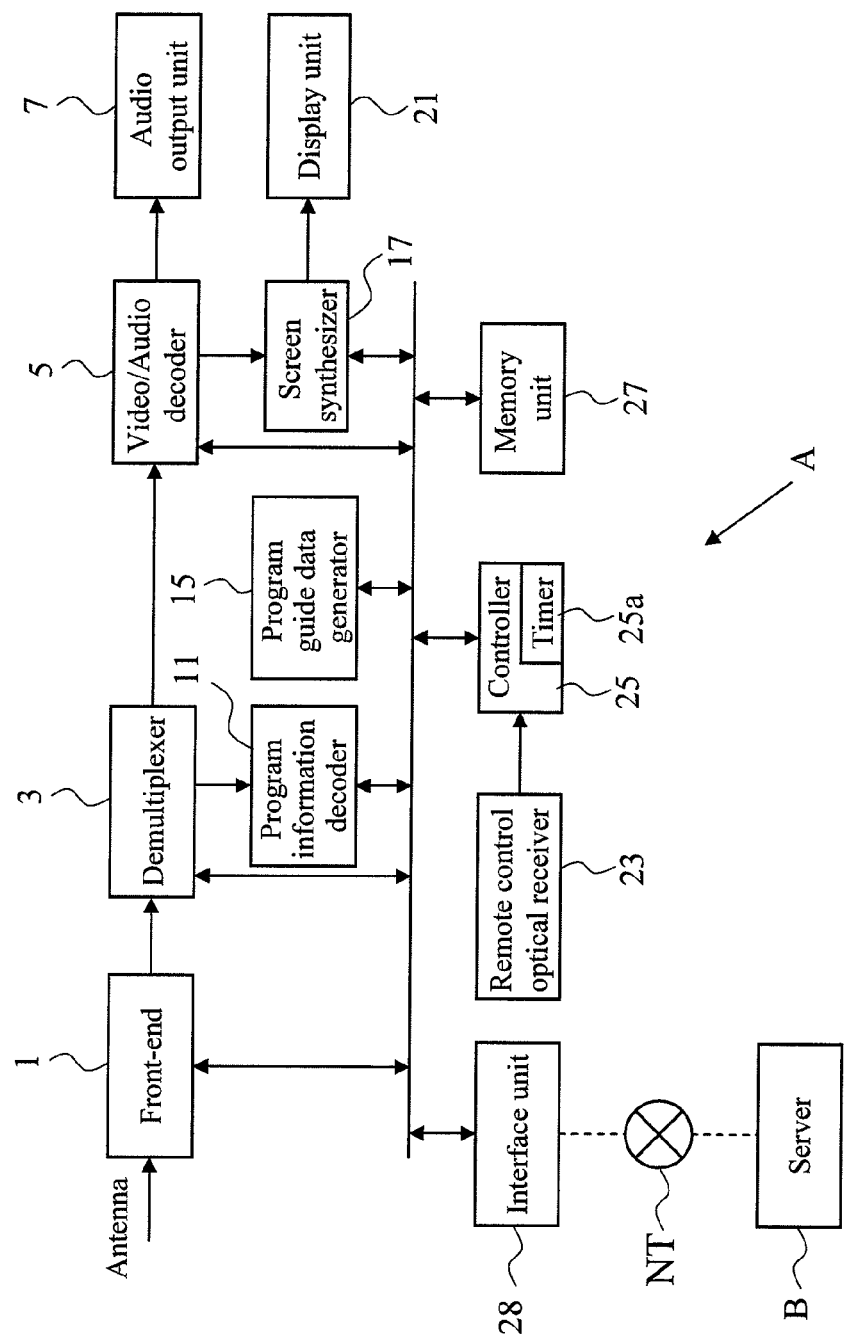
FIG. 1 is a diagram showing an example of a configuration of a digital broadcast receiver according to an embodiment of the present invention.

A DIGITAL BROADCAST RECEIVER
1 FRONT-END
3 DEMULTIPLEXER
5 VIDEO/AUDIO DECODER
7 AUDIO OUTPUT UNIT
11 PROGRAM GUIDE DECODER

15 PROGRAM GUIDE DATA GENERATOR
17 SCREEN SYNTHESIZER
21 DISPLAY UNIT
23 REMOTE CONTROL OPTICAL RECEIVER
25 CONTROLLER
25a TIMER
27 MEMORY UNIT
28 INTERFACE UNIT
B CONTENTS SERVER
NT NETWORK
31 SNTP INFORMATION
35 SI DEDICATED STREAM INFORMATION

Best Mode For Carrying Out The Invention

Basic terms are defined below before description about an embodiment of the present invention.

1) CDN (Contents Delivery Network): A network designed to deliver digital contents.

2) CDN configuration information URI: http://cdn.iptvfjp/cdn.comp: A URI that a user accesses to acquire CDN configuration information is the same irrespective of which CDN the user subscribes to. Such a URI is referred to as CDN configuration information URI.

3) DNS: A domain name system which is a system associating an IP address with a domain name of a computer connected to the Internet, and serving to replace one of them with the other. The system is managed in such a way that an IP address to be returned varies (for each CDN) depending on a DNS to be connected.

A CDN configuration information file differs from one CDN to another.

4) TCP/IP: One of protocols for synchronization of the computer clock time through a network. An abridged version of a NTP. It is defined in RFC 2030.

5) SNTP (Simple Network Time Protocol): A NTP is a protocol which configures time information servers in a hierarchical manner and synchronizes the time through information exchange. A SNTP is especially designed to allow a client to inquire of a server for the accurate time by omitting a complicated part of the specification of the NTP.

6) SI dedicated stream: SI (Service Information) denotes program arrangement information, and is various information defined for the sake of convenience of program selection. A SI dedicated stream indicates a special transport stream including no video and audio. This stream is used to transmit EIT schedule for all channels of an IP broadcast and the like in a lump.

Hereinafter, a digital broadcast reception technique according to an embodiment of the present invention will be described with reference to the drawings.

FIG. 1 is a diagram showing a configuration example of a digital broadcast receiver according to this embodiment. A digital broadcast receiver A shown in FIG. 1 includes: a front-end 1 configured to perform processes to receive signals of digital broadcasts through an antenna and tune channels; a demultiplexer 3; a video/audio decoder 5 configured to decode an output from the demultiplexer 3; a screen synthesizer 17 configured to synthesize the decoded video signal and later-described program guide data to generate a signal for display; a display unit 21 for display based on the signal synthesized in the screen synthesizer 17; and an audio output unit 7 configured to output audio.

The digital broadcast receiver A further includes: a program information decoder 11 configured to decode program information outputted from the demultiplexer 3; and an electronic program guide generator 15 configured to generate an electronic program guide based on the program information decoded by the program information decoder 11.

In addition, the digital broadcast receiver A includes: an interface unit 28 forming an interface between the receiver A and another external device; a remote control optical receiver 23 configured to receive remote control signals from a remote controller as a control device; a controller (CPU) 25 configured to control the entire device; and a memory unit (RAM, ROM) 27 configured to store an application program executed by the controller 25 for various processes and to expand and provide the program to the CPU. The interface unit 28 is capable of receiving digital contents delivered from a content server B through the Internet (NT). Further, the controller 25 is provided with a timer 25a, for example, and is thus capable of acquiring time information carried on a broadcast wave and of setting the time.

FIG. 2 is a flowchart showing a flow of time information acquisition processing in the digital broadcast receiver according to this embodiment. First, upon start of the processing (Step S1: START), after newly connected to a CDN by a user's operation (YES in Step S2), the digital broadcast receiver can acquire a CDN configuration information file (XML) (Step S3).

FIG. 3A is a view showing an example of the CDN configuration information file (XML). The CDN configuration information file includes SNTP information 31 (a protocol for allowing a client to inquire of a server for the accurate time) in addition to a CDN name and the like. Thereby, the digital broadcast receiver can inquire for time information.

Next, the digital broadcast receiver acquires a PF configuration information file written in the CDN configuration information (Step S4). FIG. 3B is a view showing an example of the PF configuration information file (XML). SI dedicated stream information 35 is described in the PF configuration information file. Information on a stream dedicated for provider use is described in the SI dedicated stream information 35. The digital broadcast receiver can carry out a channel search on the basis of this information.

The digital broadcast receiver judges whether there is an IP broadcast or not. If there is an IP broadcast (Y in Step S5), the digital broadcast receiver connects to a multicast address described in the PF configuration information file (XML) (Step S6), and acquires information on all channels in the PF from the SI dedicated stream (all station SI including no video and audio) (at the time of channel scan: Step S7). Note that, in FIG. 3B, the multicast address is represented as "ff38::100." Although the multicast address is shown here in an abbreviated manner, the non-abbreviated address is "ff38:0000:0000:0000:0000:0000:0000:0100." Here, at the time of the channel scan, the digital broadcast receiver joins the SI dedicated stream (35) to acquire NIT (scheduled channel) data for all stations. Note that, NIT is an abbreviation of Network Information Table. A NIT is used to transmit information associating a scheduled channel with transmission path information such as a multicast address for transmitting channels. In a NIT, all scheduled channel ID numbers included in one distribution system are described. Since a default cycle of a NIT retransmission cycle is one second, around two seconds are enough to acquire all channel data of one PF. This is a large difference between channel scan and program guide acquisition. For program guide acquisition, 180 seconds×2 are required at maximum. The URL of the SNTP is described in the CDN configuration information file. Time information is acquired through the SNTP at the same time as (or at a timing near the timing of, such as immediately before or immediately after) the channel scan. Since the SI dedicated stream is received through the RTP (UDP) protocol, this processing can be performed through a protocol different from the SNTP for the time information acquisition processing. Thus, the stream information and time information can be simultaneously acquired at the same timing or at near timings.

Note that, viewing of an IP broadcast is possible without acquisition of time information through the SNTP (Step S8). The processing ends with the above steps (Step S9).

Heretofore, if time information has not been acquired at the time of displaying an electronic program guide, a program guide, which lists information of the oldest EIT[schedule] or later (information of the time of 0:00 or later of the same day, for example) carried on the SI dedicated stream, can be displayed, but a program guide starting from a currently broadcasting program cannot be displayed.

To cope with this, the above procedure is carried out, i.e., program information is acquired through the SNTP at the timing of acquiring the NIT. With this procedure, the time can be acquired at the same time as or at a timing near the timing of the channel scan, i.e., the time of the timer 25a can be set at the time of the initial channel search in the initial setting. This makes it possible to also acquire time information used for acquiring information from a digital broadcast wave, such as an electronic program guide, even if almost only an IP broadcast is viewed, for example.

(Summary)

A digital broadcast receiver including a timer and capable of receiving an IP broadcast includes a controller configured to perform initial channel search processing, on the basis of SI dedicated stream information described in a PF configuration information file described in a CDN configuration information file acquired after the digital broadcast receiver is newly connected to a CDN, at a timing near a timing of time information acquisition processing through a SNTP which is described in the CDN configuration information file. The SI dedicated stream is received through the RTP (UDP) protocol which is different from the SNTP for the time information acquisition processing. By use of this, the stream information and time information can be acquired at the same time. Since the time is also set at the time of the initial channel search, even when the digital broadcast receiver receives an IP broadcast, a viewer can enjoy a service received by the receiver without any burden being imposed on the viewer.

As has been described, according to this embodiment, the time is also set at the time of the initial channel search. Thereby, even when the digital broadcast receiver receives an IP broadcast, a viewer can enjoy a service received by the receiver without any burden being imposed on the viewer.

Industrial Applicability

The present invention is applicable to a digital broadcast receiver with which viewing of an IP broadcast is possible.

The invention claimed is:

1. A digital broadcast receiver including a timer and being capable of receiving an IP broadcast, characterized by comprising a controller configured
to receive a SI dedicated stream through a RTP (UDP) protocol on the basis of SI dedicated stream information described in a PF configuration information file within a CDN configuration information file acquired after the digital broadcast receiver is newly connected to a CDN, and
to perform processing of acquiring time information through a SNTP, on the basis of SNTP information which is described in the CDN configuration information file as a protocol different from the RTP (UDP) protocol, while performing initial channel scan processing including acquiring a NIT, wherein
the controller performs the initial channel scan if an IP broadcast is found in processing to determine whether there is an IP broadcast or not.

2. The digital broadcast receiver according to claim 1, characterized in that the controller reflects the time information to the timer, and performs processing of acquiring electronic program guide information acquirable from a digital broadcast wave, on the basis of the time information in the timer.

3. The digital broadcast receiver according to claim 1, characterized in that the controller reflects the time information to the timer, and performs processing of acquiring electronic program guide information acquirable from a digital broadcast wave, on the basis of the time information in the timer.

4. A reception method in a digital broadcast receiver including a timer and being capable of receiving an IP broadcast, the method characterized by comprising the steps of searching the existence of the IP broadcast,
receiving a SI dedicated stream through a RTP (UDP) protocol on the basis of SI dedicated stream information described in a PF configuration information file described within a CDN configuration information file acquired after the digital broadcast receiver is newly connected to a CDN, and
when an IP broadcast is found in the searching step, performing initial channel scan processing at a timing near a timing of processing of acquiring time information through a SNTP, on the basis of SNTP information which is described in the CDN configuration information file as a protocol different from the RTP (UDP) protocol, by use of the SI dedicated stream,
wherein the protocol of SI is different from that of SNTP protocol,
wherein the time information is acquired from the SNTP at the timing of acquiring a NIT during the initial channel scan,
wherein the stream information and time information are acquired at the same time, and the time is set at the time of the initial channel scan by obtaining the channel information in the SI dedicated stream.

5. A non-transitory computer-readable recording medium on which a program is recorded, which causes a computer to execute the method described in claim 4.

* * * * *